United States Patent
Santry

(10) Patent No.: US 9,934,008 B2
(45) Date of Patent: Apr. 3, 2018

(54) METHODS FOR FACILITATING PERSISTENT STORAGE OF IN-MEMORY DATABASES AND DEVICES THEREOF

(71) Applicant: NetApp, Inc., Sunnyvale, CA (US)

(72) Inventor: Douglas Joseph Santry, Ft. Lauderdale, FL (US)

(73) Assignee: NetApp, Inc., Sunnyvale, CA (US)

( * ) Notice: Subject to any disclaimer, the term of this patent is extended or adjusted under 35 U.S.C. 154(b) by 658 days.

(21) Appl. No.: 14/308,272

(22) Filed: Jun. 18, 2014

(65) Prior Publication Data

US 2015/0370544 A1  Dec. 24, 2015

(51) Int. Cl.
*G06F 9/45* (2006.01)
*G06F 9/445* (2018.01)
*G06F 9/46* (2006.01)
*G06F 9/44* (2018.01)

(52) U.S. Cl.
CPC ............ *G06F 8/41* (2013.01); *G06F 9/44521* (2013.01); *G06F 9/466* (2013.01); *G06F 9/4435* (2013.01)

(58) Field of Classification Search
None
See application file for complete search history.

(56) References Cited

U.S. PATENT DOCUMENTS

| | | | |
|---|---|---|---|
| 5,721,918 A * | 2/1998 | Nilsson | G06F 11/1471 |
| 6,128,771 A * | 10/2000 | Tock | G06F 8/30 707/999.001 |
| 6,915,510 B1 * | 7/2005 | Tock | G06F 8/30 717/165 |
| 9,646,012 B1 * | 5/2017 | Malige | G06F 17/30082 |
| 2002/0116404 A1 * | 8/2002 | Cha | G06F 11/1471 707/999.202 |
| 2003/0069890 A1 * | 4/2003 | Benson | G06F 17/3056 707/999.103 |
| 2003/0074600 A1 * | 4/2003 | Tamatsu | G06F 11/1458 714/5.11 |
| 2003/0120669 A1 * | 6/2003 | Han | G06F 11/1666 707/999.1 |

(Continued)

OTHER PUBLICATIONS

Felber et al. "Transactify Applications using an Open Compiler Framework", 2007, Transact 2007.*

(Continued)

*Primary Examiner* — Jue Louie
(74) *Attorney, Agent, or Firm* — LeClairRyan, a Professional Corporation

(57) ABSTRACT

A method, non-transitory computer readable medium, and application host computing device that parses assembly language code to identify a transaction block including an assignment to a memory location, the assembly language code associated with an application and output by a compiler. The assembly language code is modified to insert an invocation of a plurality of functions collectively configured to facilitate persistent storage of one or more data updates associated with the assignment at run-time. The assembly language code is assembled to generate object code and the object code is linked with at least a run-time library including a definition for each of the plurality of inserted functions to generate an executable file for the application.

21 Claims, 4 Drawing Sheets

(56) References Cited

U.S. PATENT DOCUMENTS

| | | | | |
|---|---|---|---|---|
| 2005/0223367 | A1* | 10/2005 | Smith | G06F 11/3636 717/128 |
| 2006/0236065 | A1* | 10/2006 | Lee | G06F 12/023 711/171 |
| 2008/0162590 | A1* | 7/2008 | Kundu | G06F 11/1471 707/999.202 |
| 2008/0222159 | A1* | 9/2008 | Aranha | G06F 17/30289 707/999.01 |
| 2008/0270745 | A1* | 10/2008 | Saha | G06F 9/3834 712/1 |
| 2012/0227045 | A1* | 9/2012 | Knauth | G06F 9/3863 718/100 |
| 2012/0265743 | A1* | 10/2012 | Ivanova | G06F 17/30377 707/702 |
| 2013/0125097 | A1* | 5/2013 | Ebcioglu | G06F 17/5045 717/136 |
| 2014/0195564 | A1* | 7/2014 | Talagala | G06F 12/0804 707/802 |
| 2014/0325116 | A1* | 10/2014 | McKelvie | G06F 12/0246 711/103 |

OTHER PUBLICATIONS

Giles et al. "Software Support for Atomicity and Persistence in Non-volatile Memory", Oct. 2013, Memory Organization and Architecture Workshop.*
McObject, "In-Memory Database Systems—Questions and Answers", 2009, retrieved from: https://web.archive.org/web/20090123093213/http://www.mcobject.com/in_memory_database.*
Aurenhammer, F., "Voronoi Diagrams: A Survey of Fundamental Geometric Data Structure," ACM Computing Surveys 23(3):345-405 (1991).
Bender, et al., "Cache-Oblivious Streaming B-trees," SPAA (2007).
Boncz, et al., "Database Architecture Optimized for the New Bottleneck: Memory Access" VLBD (1999).
Ester, et al., "A Density-Based Algorithm for Discovering Clusters in Large Spatial Databases with Noise," Proceedings of the Second International Conference on Knowledge Discovery and Data Mining (1996).
Freitas, et al., "Storage Class Memory: Technologies, Systems, and Applications," USENIX FAST 2012 Tutorials (2012).
Guerra, et al., "Software Persistent Memory," USENIX ATC (2012).
Herlihy, et al., "Transactional Memory: Architectural Support for Lock-Free Data Structures," Annual International Symposium on Computer Architecture (1993).
Stonebraker, et al., "One Size Fits All: An Idea whose Time has Come and Gone," ICDE (2005).
Stonebraker, et al., "The End of an Architectural Era (It's Time for a Complete Rewrite)," VLBD (2007).
Stonebraker, et al., "New SQL: An Alternative to NoSQL and Old SQL for New OLTP Apps," Communications of the ACM (2011).
Farber, et al., "SAP HANA Database: Data Management for Modern Business Applications," SIGMOD Record (2012).
O'Neil, et al., "The Log-Structured Merge-Tree (LSM-Tree)." Acta Informatica 33 (1996).
"Oracle TimesTen In-Memory Database on Oracle Exalogic Elastic Could," Oracle White Paper (Jul. 2011).
"VoltDB: High Performance, Scalable RDBMS for Big Data and Real-Time Analytics," White Paper (2012).
Zawodny, J., "Redis: Lightweight key/value Store That Goes the Extra Mile," Linux Magazine (Aug. 31, 2009).
SNIA NVM Programming Model, version 1.0.0 Revision 5 Working Draft (Jun. 12, 2013).
Rudolf, et al., "The Graph Story of the SAP HANA Database," BTW (2013).
Intel 64 and IA-32 Architectures Optimization Reference Manual Document No. 248966-028 (Jul. 2013).
Prabhakaran, et al., "Managing Large Graphs on Multi-Cores with Graph Awareness," USENIX ATC (2012).
Bronson, et al., "TAO: Facebook's Distributed Data Store for the Social Graph," USENIX ATC (2013).
Luchangco, et al.,"Transactional Memory Support for C++," retrieved from www.open-std.org/jtcl/sc22/wg21/docs/papers/2014/n3859.pdf (Jan. 20, 2014).

* cited by examiner

METHODS FOR FACILITATING PERSISTENT STORAGE OF IN-MEMORY DATABASES AND DEVICES THEREOF

FIELD

This technology generally relates to maintaining backup copies of data used by applications in the event of an application host computing device failure and, more particularly, to methods and devices for facilitating fine-grained, byte-level persistent storage of in-memory databases.

BACKGROUND

Increasingly organizations are generating business value by performing analytics on data generated by both machines and humans. Not only are more types of data being analyzed by analytics frameworks, but increasingly users are also expecting real-time responses to their analytic queries. Fraud detection systems, enterprise supply chain management systems, mobile location based service systems, and multi-player gaming systems are some examples of applications that utilize realtime analytics capabilities.

In these systems, both transaction management and analytics related query processing are generally performed on the same copy of data. These applications generally have very large working sets of data and generate millions of transactions per second. In many cases these applications cannot tolerate significant network and disk latencies, and therefore employ main memory architectures on the application host computing device to fit the entire working set in memory, such as in an in-memory database.

Even though entire working sets are often stored in main memory, to protect from failure of the application host computing device, many applications also store a copy of their data off the application host computing device. Typically, copies are stored on disk or flash-based storage server devices because these technologies are relatively less expensive than main memory that may be available in a peer device, for example. Thus, there is often a bifurcation of Input/Output Operations Per Second (IOPs) optimized data management at the application host computing device and capacity-optimized data management at the backend disk or flash-based storage server devices.

This bifurcation results in a mismatch in the fine-grained data management model on the application host computing device and the block-optimized data management model in the backend disk or flash-based storage server devices. Currently, many application and middleware developers are forced to map their in-memory fine-grained data structures onto intermediate block-I/O-friendly data structures.

The in-memory data structures are part of memory pages that are, in turn, mapped to disk blocks using data structures such as binary trees, for example, that have been designed to localize updates to a block in order to minimize random I/Os to the disk-based storage server devices. In order to facilitate this mapping and backup to persistent storage, entire pages of memory in which updated bytes of data reside must be transferred, which is undesirable and often requires a significant amount of time, bandwidth, and other resources.

SUMMARY

An application host computing device includes a processor coupled to a memory and configured to execute programmed instructions stored in the memory to parse assembly language code to identify a transaction block including an assignment to a memory location, the assembly language code associated with an application and output by a compiler. The assembly language code is modified to insert an invocation of a plurality of functions collectively configured to facilitate persistent storage of one or more data updates associated with the assignment at run-time. The assembly language code is assembled to generate object code and the object code is linked with at least a run-time library including a definition for each of the plurality of inserted functions to generate an executable file for the application.

A method for facilitating persistent storage of in-memory databases includes parsing with an application host computing device assembly language code to identify a transaction block including an assignment to a memory location, the assembly language code associated with an application and output by a compiler. The assembly language code is modified with the application host computing device to insert an invocation of a plurality of functions collectively configured to facilitate persistent storage of one or more data updates associated with the assignment at run-time. The assembly language code is assembled with the application host computing device to generate object code and the object code is linked with at least a run-time library including a definition for each of the plurality of inserted functions to generate an executable file for the application.

A non-transitory computer readable medium having stored thereon instructions for facilitating persistent storage of in-memory databases includes machine executable code which when executed by a processor, causes the processor to perform steps including parsing assembly language code to identify a transaction block including an assignment to a memory location, the assembly language code associated with an application and output by a compiler. The assembly language code is modified to insert an invocation of a plurality of functions collectively configured to facilitate persistent storage of one or more data updates associated with the assignment at run-time. The assembly language code is assembled to generate object code and the object code is linked with at least a run-time library including a definition for each of the plurality of inserted functions to generate an executable file for the application.

With this technology, fine-grained updates made in memory at an application host computing device can be efficiently detected, transmitted, and persisted without requiring the transfer of entire memory pages on which the updates reside. Since operations are performed on assembly language code, any language used to develop an application and that is compiled to native assembly language code can be supported. Additionally, minimal programmer effort is required to obtain the backup functionality and the programmer and application may not even be aware of the modifications made to the compiled code, or the run-time functionality resulting from the modifications.

DETAILED DESCRIPTION

Figure 1:
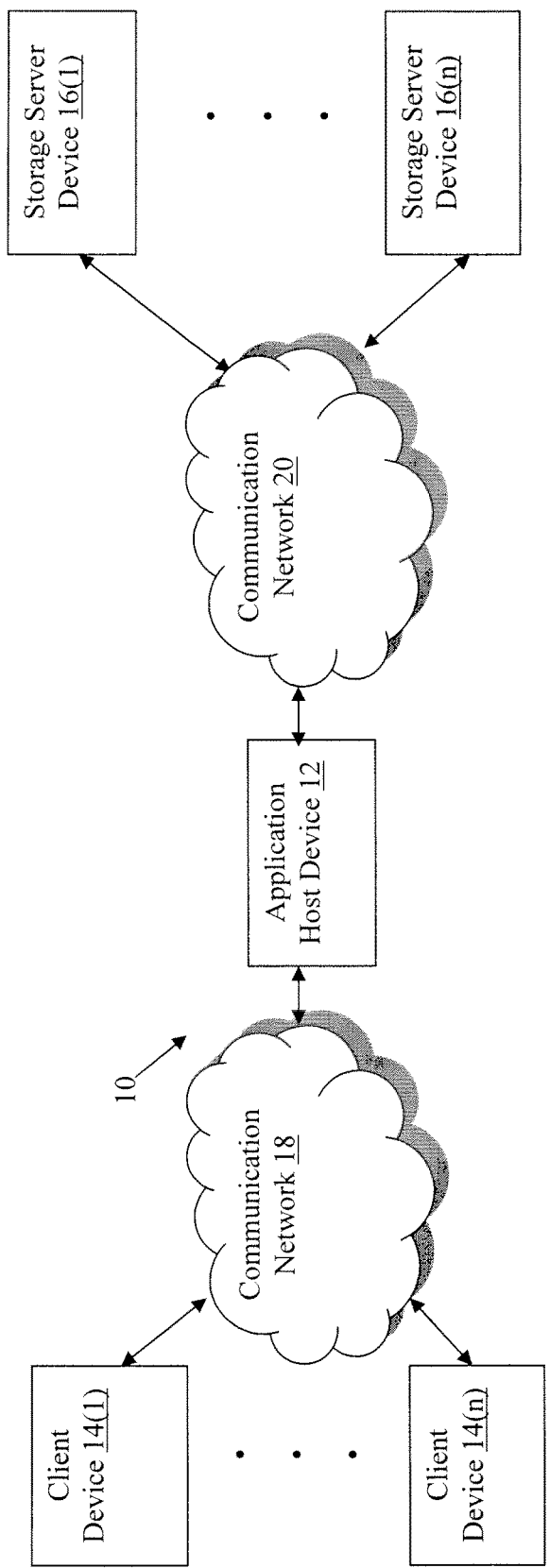
FIG. 1 is a block diagram of a network environment which incorporates an exemplary application host computing device.

A network environment 10 with an exemplary application host computing device 12 is illustrated in FIG. 1. The exemplary environment 10 further includes client devices 14(1)-14(n) and storage server devices 16(1)-16(n), although this environment 10 can include other numbers and types of systems, devices, components, and/or elements in other configurations, such as a storage controller for the storage server devices 16(1)-16(n) and/or multiple numbers of each of these devices. The client devices 14(1)-14(n) are in communication with the application host computing device 12 through communication network 18 and the application host computing device 12 is in communication with the storage devices 16(1)-16(n) through another communication network 20. The communication networks 18 and 20 can be local area networks (LANs), wide area networks (WANs), or combination thereof, for example. This technology provides a number of advantages including methods, non-transitory computer readable medium, and devices that more efficiently facilitate fine-grained persistent storage of in-memory databases, such as for purposes of disaster or failure recovery.

Each of the client devices 14(1)-14(n) in this example can include a processor, a memory, a communication interface, an input device, and a display device, which are coupled together by a bus or other link, although each of the client devices 14(1)-14(n) can have other types and numbers of components. The client devices 14(1)-14(n) may run interface applications that provide an interface to exchange data with applications hosted by the application host computing device 12, for example. Each of the client devices 14(1)-14(n) may be, for example, a conventional personal computer (PC), a workstation, a smart phone, or other processing and/or computing system.

The storage server devices 16(1)-16(n) in this example receive and respond to various read and write requests from the application host computing device 12, such as requests to write or store data as a backup, as described and illustrated in more detail later. Each of the storage server devices 16(1)-16(n) can include a processor, a memory, and a communication interface, which are coupled together by a bus or other link, although each of the storage server devices 16(1)-16(n) can have other types and numbers of components. The memory can include conventional magnetic or optical disks, or any other type of non-volatile persistent storage suitable for storing large quantities of data in a block-based architecture.

Figure 2:
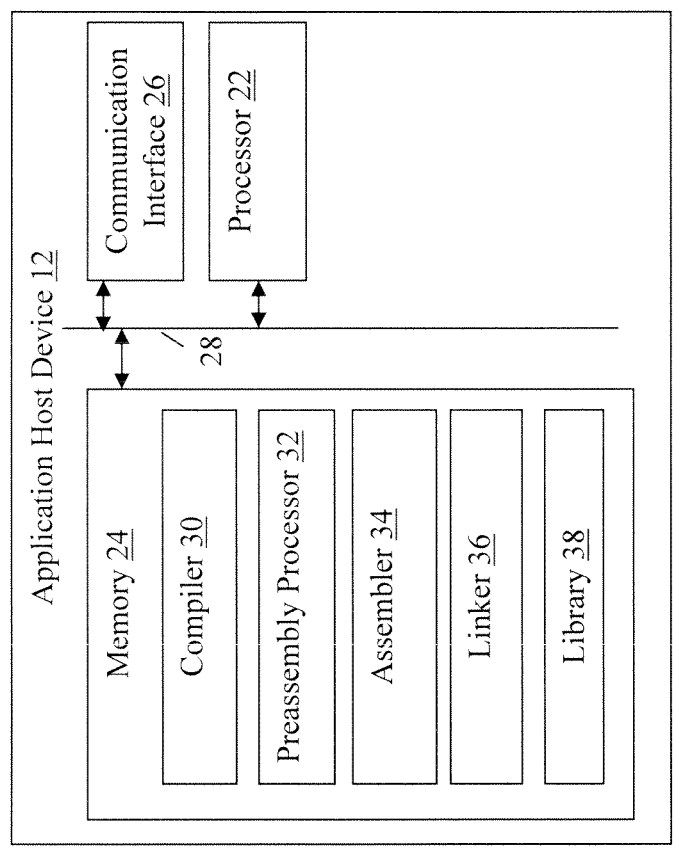
FIG. 2 a block diagram of the exemplary application host computing device.

The application host computing device 12 compiles and executes applications that can be utilized by the client devices 14(1)-14(n) and which can utilize the storage server devices 16(1)-16(n) to store backup copies of data maintained in database(s) in local memory. Referring more specifically to FIG. 2, a block diagram of the exemplary application host computing device 12 is illustrated. In this example, the application host computing device 12 includes a processor 22, a memory 24, and a communication interface 26 coupled together by a bus 28 or other link, although other numbers and types of devices can also be used.

The processor 22 in the application host computing device 12 executes a program of stored instructions one or more aspects of the present invention, as described and illustrated by way of the embodiments herein, although the processor 22 could execute other numbers and types of programmed instructions. The processor 22 in the application host computing device 12 may include one or more central processing units or general purpose processors with one or more processing cores, for example.

The memory 24 in the application host computing device 12 stores these programmed instructions for one or more aspects of the present invention, as described and illustrated herein, although some or all of the programmed instructions can be stored and/or executed elsewhere. A variety of different types of memory storage devices including random access memory (RAM), such as dynamic RAM (DRAM), or other computer readable medium which is read from and/or written to by a magnetic, optical, or other reading and/or writing system that is coupled to the processor 22 can be used.

In this example, the memory 24 includes a compiler 30, a preassembly processor 32, an assembler 34, a linker 36, and a library 38. The compiler 30 receives high level language (e.g., C++) source code for an application and outputs assembly language code. In this example, the preassembly processor 32 receives the assembly language code output by the compiler 30 and modifies the code to insert invocations of functions configured to facilitate fine-grained persistent storage at run-time of data utilized by the application, such as data stored in a DRAM portion of the memory 24 for example, as described and illustrated in more detail later.

The assembler 34 receives the modified assembly language code and outputs object code. The linker 36 converts the object code output by the assembler 34 into an executable file. In order to generate an executable file, the linker 36 incorporates content (e.g., objects) from the library 38, which in this example includes definitions for the functions for which invocations were inserted by the preassembly processor 32, as described and illustrated in more detail later. The memory 24 can also include the high level language source code for one or more applications, an operating system, and/or other modules, and/or libraries, for example.

The communication interface 26 in the application host computing device 12 is used to communicate between the client devices 14(1)-14(n) and storage server devices 16(1)-16(n), which are all coupled together via the communication networks 18 and 20, although other types and numbers of communication networks or systems with other types and numbers of connections and configurations to other devices and elements can also be used. By way of example only, one or more of the communication networks 18 and 20 can use TCP/IP over Ethernet and industry-standard protocols, including hypertext transfer protocol (HTTP), and/or secure HTTP (HTTPS), although other types and numbers of communication networks each having their own communications protocols can also be used.

Although examples of the application host computing device 12, client devices 14(1)-14(n), and storage server devices 16(1)-16(n) are described herein, the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples may also be embodied as a non-transitory computer readable medium having instructions stored thereon for one or more aspects of the present technology as described and illustrated by way of the examples herein, as described herein, which when executed by the processor 22 in the application host computing device 12, cause the processor 22 to carry out the steps necessary to implement the methods of the examples, as described and illustrated herein.

Figure 3:
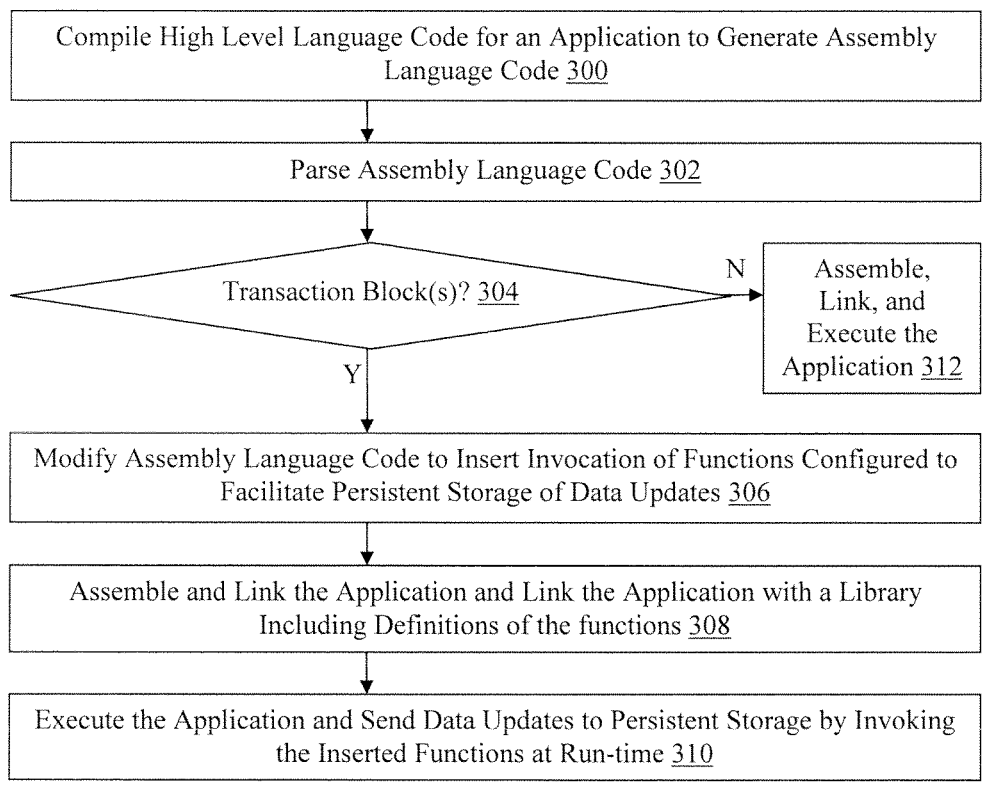
FIG. 3 is a flowchart of an exemplary method for facilitating persistent storage of in-memory databases.

Referring to FIGS. 1-4, an exemplary method for facilitating persistent storage of in-memory databases maintained in the memory 24 and used by applications hosted by the application host computing device 12 will now be described. Referring more specifically to FIG. 3, in step 300 in this example, the compiler 30 of the application host computing device 12 compiles high level language code for an application and generates and outputs assembly language code. The high level language code can be C++ for example, although any other language that can be compiled to assembly language code can also be used. The high level language code can be stored in one or more source code files in the memory 22 of the application host computing device 12, although some or all of the high level language code can also be stored elsewhere.

In step 302, the preassembly processor 32 of the application host computing device 12 parses the assembly language code output by the compiler 28 to identify any transaction blocks included in the assembly language code.

Figure 4:
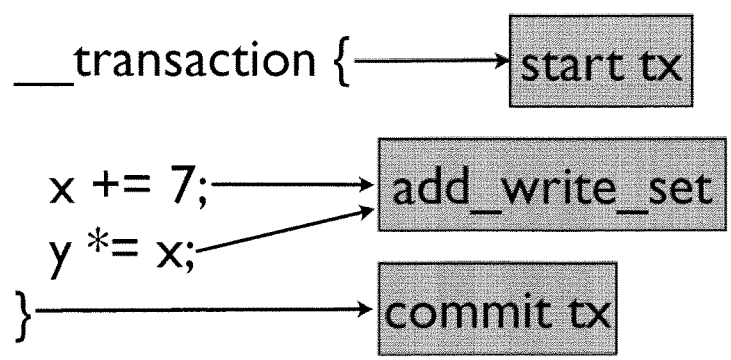
FIG. 4 is a fragment of a transaction block in high level language code.

In step 304, the preassembly processor 30 of the application host computing device 12 determines whether at least one transaction block was identified during the parsing. Referring to FIG. 4, a fragment of a transaction block in C++ high level language code is illustrated. In this example, the fragment includes a reserved word associated with a transaction block and two memory assignment statements. In this example the "transaction" is a C++ reserved word indicating that everything between the brackets following the reserved word is included in a transaction, although other reserved words and/or other high level languages can also be used.

Accordingly, the compiler 30 in this example will generate assembly language instructions in response to encountering the "transaction" reserve word in the C++ high level language code. In one example xbegin and xend instructions are the assembly language instructions that are generated. The xbegin and xend instructions are provided for use by processors, such as the Haswell™ line of processors available from Intel Corporation of Santa Clara, Calif., which offer a Restricted Transactional Memory (RTM) feature in their Transactional Synchronization Extensions (TSX) facility. In this example, the xbegin and xend instructions demarcate a transaction in assembly language code and can be used by the preassembly processor 32 to identify transaction blocks, although other types and numbers of assembly language instruction(s) can also be used to indicate a transaction block. If the preassembly processor 32 of the application host computing device 12 determines in step 304 that at least one transaction block was identified, then the Yes branch is taken to step 306.

In step 306, the preassembly processor 32 of the application host computing device 12 modifies the assembly language code for each transaction block. The assembly language code is modified for each transaction block to insert invocations of functions configured to facilitate persistent storage of data updates when invoked at run-time. In this example, the functions include a first function (also referred to herein as "start tx"), a second function (also referred to herein as "add_write_set"), and a third function (also referred to herein as "commit tx").

An invocation of the start tx function is inserted in this example following a begin instruction, such as xbegin in the example described herein, although the invocation of the start tx function can be inserted following other types of instructions and in other locations. The start tx function in this example is defined in the library 36 in the memory 24 of the application host computing device 12 and, when invoked, is configured to allocate a transaction descriptor data structure and place a pointer to the transaction descriptor on a stack associated with the application. The transaction descriptor is a data structure (e.g., array or vector) that stores information used to persist data updates, as described and illustrated in more detail later. Referring back to FIG. 4, the _transaction reserve word in this example is compiled to an xbegin instruction which is followed by a start tx function call inserted by the preassembly processor 32.

An invocation of the add_write_set function is inserted in this example proximate to each assignment in each transaction block, although the invocation of the add_write_set function can be inserted following other types of instructions and in other locations. Assignments can be identified in this example in which Intel Corporation hardware is used, by the "mov" instruction which has a type and is followed by a memory address, although in other examples assignments can be identified based on other types and numbers of instruction(s). Accordingly, assignments are compiled to mov instructions which are each followed, for example, by an add_write_set function call inserted by the preassembly processor 32.

The add_write_set function in this example is defined in the library 36 in the memory 24 of the application host computing device 12, and, when invoked, is configured to determine when an assignment requires replication and, if it does, to insert information including at least a location and a size associated with the assignment into an entry of the transaction descriptor allocated for the associated transaction block. The location can be identified based on a memory address following the mov instruction and the size can be based on the type of mov instruction present in the transaction block of the assembly language code, although other methods of identifying the location and size of the assignment can also be used.

Accordingly, the add_write_set function, when invoked, is configured to insert the memory address following the mov instruction for the assignment and the size of the assignment, which is based on the type of mov instruction, into the transaction descriptor only when the assignment is determined to require replication. In order to determine when the assignment requires replication or persistence, the add_write_set function, when invoked, is configured to determine whether the memory location of the assignment is within a range of a mapped region for the application. In this example, only assignments to memory locations in the mapped region of the memory 24 need to be persisted. Accordingly, the memory address following the mov instruction can be compared against a range of a previously determined mapped region in the memory 24 for the application to determine whether the assignment needs to be persisted.

For example, assignments of variables on the stack (e.g., "i" in the statement "for (int i=0; i<100; i++)") do not need to be persisted. Accordingly, the add_write_set function will not insert an entry into the transaction descriptor for the assignment of the "i" variable. Referring back to FIG. 4, in another example, the "x" and "y" variables of the assignments of the transaction block illustrated in FIG. 4 do need to be persisted and the associated memory locations will be within the mapped region for the application. Accordingly, the memory locations and size associated with the "x+=7;" and "y*=x;" assignments in this example will be inserted into an entry of the transaction descriptor when the add_write_set function is invoked at run-time.

An invocation of the commit tx function is inserted in this example following an end instruction, such as xend in the example described herein, although the invocation of the commit tx function can be inserted following other types of instructions and in other locations. The commit tx function in this example is defined in the library 36 in the memory 24 of the application host computing device 12 and, when invoked, is configured to replicate data associated with entries of the transaction descriptor to persistent data storage, such as on one or more of the storage server devices 16(1)-16(n), for example, although the persistent data storage can be located on a peer device or elsewhere.

Accordingly, the commit tx function is configured to, when invoked, traverse the entries of the transaction descriptor, allocated for an associated transaction block by an execution of the start tx function, and send data identified by the memory location and size included in those entries to persistent data storage. The memory location and size is included in the entries by the execution of one or more add_write_set functions for the associated transaction block.

Referring back to FIG. 4, the _transaction reserve word in this example, or the closing bracket following the _transaction reserve word, is compiled to an xend instruction which is followed by a commit tx function call inserted by the preassembly processor 32. Optionally, the commit tx function call is inserted outside of the transaction block since system calls may be required by invocation of the commit tx function. In this example in which the RTM of the Intel hardware is used, system calls within a transaction block would result in the transaction being aborted.

Referring back to FIG. 3, in step 308 the assembler 34 of the application host computing device 12 assembles the assembly language code to generate object code and the linker 36 of the application host computing device 12 links the object code with one or more libraries, including at least library 38, in order to generate an executable file for the application. The library 38 is linked by the linker 36 in this example as it includes the definitions for the start tx, add_write_set, and commit tx functions, invocations of which were inserted into the assembly language code as described and illustrated earlier.

In step 310, the application host computing device executes the executable file for the application and sends data updates to persistent data storage by invoking the inserted functions at run-time. When the functions are executed, transactions occurring in the application at run-time will advantageously be replicated to persistent data storage with byte-level granularity and without requiring whole pages of memory in which updated data resides to be transferred.

Referring back to step 304, if the preassembly processor 32 of the application host computing device 12 determines that no transaction blocks were identified in the parsed assembly language code, then the No branch is taken to step 312. In step 312, the assembler 34 of the application host computing device 12 assembles the assembly language code into object code, the linker 36 of the application host computing device 12 links the object code with any necessary libraries to generate an executable file, and the application host computing device 12 executes the executable file to run the application. Accordingly, in examples in which no transaction blocks are identified, linking the object code with library 38 is optional and no data updates will be sent to persistent storage.

With this technology, data updates can be persisted with byte-level granularity such that less data is transferred to persistent data storage and, accordingly, fewer resources are required to provide a backup data store that can be used to restore state in the event of a failure of an application host computing device. Advantageously, a persistent data store can be provided for an increased number of high level languages, with the only requirement being that the high level language is compiled to native assembly language code. Additionally, programmer intervention is minimal or not required as the updated data is persisted automatically and dynamically at run-time.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A computing device, comprising:
    a memory containing a machine readable medium comprising machine executable code having stored thereon instructions for facilitating persistent storage of in-memory databases; and
    a hardware processor coupled to the memory, the processor configured to execute the machine executable code to cause the processor to:
        identify a transaction block in assembly language code associated with an application, the transaction block comprising an assignment to a location in an in-memory database;
        modify the assembly language code to insert one or more functions configured to, when invoked at run-time:
            determine when the location associated with the assignment in the transaction block of the assembly language code is within a range of a region mapped to the application by comparing the location against the range of the region mapped to the application; and
            facilitate persistent storage of one or more data updates associated with the assignment in the transaction block of the assembly language code by inserting the location and a size associated with the assignment in the transaction block of the assembly language code into an entry of a data structure and replicating data associated with the entry to persistent data storage, only when the location is within the range of the region mapped to the application; and
        assemble the assembly language code to generate object code and link the object code with a run-time library comprising a definition for the inserted functions to generate an executable file.

2. The device of claim 1, wherein the functions comprise a first function an invocation of which is inserted following a begin instruction of the transaction block, a second function an invocation of which is inserted proximate to the assignment, and a third function an invocation of which is inserted following an end instruction of the transaction block and outside of the transaction block.

3. The device of claim 2, wherein the begin instruction is an xbegin instruction, the assignment is associated with a mov instruction, and the end instructions is an xend instruction.

4. The device of claim 1, wherein the data structure comprises a transaction descriptor and the functions comprise a first function that allocates the transaction descriptor and places a pointer to the transaction descriptor on a stack, a second function that inserts at least the location and the size associated with the assignment into the entry of the transaction descriptor, and a third function that replicates data associated with the entry of the transaction descriptor to persistent data storage.

5. The device of claim 4, wherein the location in the in-memory database is a location in a dynamic random access memory (DRAM), the persistent data storage comprises block-based disk storage, and the functions are further configured to facilitate persistent storage of the one or more data updates with byte-level granularity.

6. The device of claim 1, wherein the hardware processor coupled to the memory is further configured to execute the machine executable code to cause the hardware processor to execute the executable file and send the one or more data updates to persistent data storage by invoking the functions at run-time.

7. The device of claim 1, wherein the location comprises a memory address associated with the assignment in the transaction block and the size is based on a type of the assignment.

8. A method of facilitating persistent storage of in-memory databases, comprising:
identifying, by a computing device, a transaction block in assembly language code associated with an application, the transaction block comprising an assignment to a location in an in-memory database;
modifying, by the computing device, the assembly language code to insert one or more functions configured to, when invoked at run-time:
determine when the location associated with the assignment in the transaction block of the assembly language code is within a range of a region mapped to the application by comparing the location against the range of the region mapped to the application; and
facilitate persistent storage of one or more data updates associated with the assignment in the transaction block of the assembly language code by inserting the location and a size associated with the assignment in the transaction block of the assembly language code into an entry of a data structure and replicating data associated with the entry to persistent data storage, only when the location is within the range of the region mapped to the application; and
assembling, by the computing device, the assembly language code to generate object code and linking the object code with a run-time library comprising a definition for the inserted functions to generate an executable file.

9. The method of claim 8, wherein the functions comprise a first function an invocation of which is inserted following a begin instruction of the transaction block, a second function an invocation of which is inserted proximate to the assignment, and a third function an invocation of which is inserted following an end instruction of the transaction block and outside of the transaction block.

10. The method of claim 9, wherein the begin instruction is an xbegin instruction, the assignment is associated with a mov instruction, and the end instructions is an xend instruction.

11. The method of claim 8, wherein the data structure comprises a transaction descriptor and the functions comprise a first function that allocates the transaction descriptor and places a pointer to the transaction descriptor on a stack, a second function that inserts at least the location and the size associated with the assignment into the entry of the transaction descriptor, and a third function that replicates data associated with the entry of the transaction descriptor to persistent data storage.

12. The method of claim 11, wherein the location in the in-memory database is a location in a dynamic random access memory (DRAM), the persistent data storage comprises block-based disk storage, and the functions are further configured to facilitate persistent storage of the one or more data updates with byte-level granularity.

13. The method of claim 8, further comprising executing, by the computing device, the executable file and sending the one or more data updates to persistent data storage by invoking the functions at run-time.

14. The method of claim 8, wherein the location comprises a memory address associated with the assignment in the transaction block and the size is based on a type of the assignment.

15. A non-transitory machine readable medium having stored thereon instructions for facilitating persistent storage of in-memory databases comprising machine executable code which when executed by at least one machine, causes the machine to:
identify a transaction block in assembly language code associated with an application, the transaction block comprising an assignment to a location in an in-memory database;
modify the assembly language code to insert one or more functions configured to, when invoked at run-time:
determine when the location associated with the assignment in the transaction block of the assembly language code is within a range of a region mapped to the application by comparing the location against the range of the region mapped to the application; and
facilitate persistent storage of one or more data updates associated with the assignment in the transaction block of the assembly language code by inserting the location and a size associated with the assignment in the transaction block of the assembly language code into an entry of a data structure and replicating data associated with the entry to persistent data storage, only when the location is within the range of the region mapped to the application; and
assemble the assembly language code to generate object code and link the object code with a run-time library comprising a definition for the inserted functions to generate an executable file.

16. The medium of claim 15, wherein the functions comprise a first function an invocation of which is inserted following a begin instruction of the transaction block, a second function an invocation of which is inserted proximate to the assignment, and a third function an invocation of which is inserted following an end instruction of the transaction block and outside of the transaction block.

17. The medium of claim 16, wherein the begin instruction is an xbegin instruction, the assignment is associated with a mov instruction, and the end instructions is an xend instruction.

18. The medium of claim 15, wherein the data structure comprises a transaction descriptor and the functions comprise a first function that allocates the transaction descriptor and places a pointer to the transaction descriptor on a stack, a second function that inserts at least the location and the size associated with the assignment into the entry of the transaction descriptor, and a third function that replicates data associated with the entry of the transaction descriptor to persistent data storage.

19. The medium of claim 18, wherein the location in the in-memory database is a location in a dynamic random access memory (DRAM), the persistent data storage comprises block-based disk storage, and the functions are further configured to facilitate persistent storage of the one or more data updates with byte-level granularity.

20. The medium of claim 15, wherein the machine executable code when executed by the machine, further causes the machine to execute the executable file and send the one or more data updates to persistent data storage by invoking the functions at run-time.

21. The medium of claim 15, wherein the location comprises a memory address associated with the assignment in the transaction block and the size is based on a type of the assignment.

* * * * *